(12) United States Patent
Ari et al.

(10) Patent No.: US 8,348,036 B2
(45) Date of Patent: Jan. 8, 2013

(54) TWO PASS MULTI-FUNCTION TORQUE CONVERTER

(75) Inventors: Vural Ari, Wooster, OH (US); Todd J. Sturgin, Shreve, OH (US); Kevin Parks, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1048 days.

(21) Appl. No.: 12/218,141

(22) Filed: Jul. 11, 2008

(65) Prior Publication Data

US 2009/0014269 A1  Jan. 15, 2009

Related U.S. Application Data

(60) Provisional application No. 60/959,113, filed on Jul. 11, 2007.

(51) Int. Cl.
F16H 61/14 (2006.01)
F16H 45/02 (2006.01)

(52) U.S. Cl. ........................ 192/3.3; 192/85.63

(58) Field of Classification Search .................. 192/3.3, 192/3.29, 3.25, 3.26, 85.63, 48.609, 48.611
See application file for complete search history.

(56) References Cited

U.S. PATENT DOCUMENTS

| | | | | |
|---|---|---|---|---|
| 4,153,147 A | * | 5/1979 | Chana | 192/3.28 |
| 4,194,604 A | * | 3/1980 | Nichols et al. | 192/3.3 |
| 4,785,923 A | * | 11/1988 | Ushijima | 192/3.3 |
| 5,699,887 A | | 12/1997 | Kundermann | |
| 6,494,303 B1 | | 12/2002 | Reik et al. | |
| 6,497,312 B1 | * | 12/2002 | Sasse et al. | 192/3.29 |
| 6,564,914 B1 | * | 5/2003 | Glock et al. | 192/3.29 |
| 6,698,561 B2 | * | 3/2004 | Kundermann et al. | 192/3.29 |
| 7,815,026 B2 | * | 10/2010 | Povirk et al. | 192/3.26 |
| 2006/0207852 A1 | * | 9/2006 | Adelmann | 192/3.29 |
| 2007/0074943 A1 | * | 4/2007 | Hemphill et al. | 192/3.25 |
| 2007/0287581 A1 | * | 12/2007 | Parks et al. | |
| 2008/0000745 A1 | | 1/2008 | Swank et al. | |
| 2008/0149441 A1 | * | 6/2008 | Sturgin | 192/3.25 |
| 2008/0149442 A1 | * | 6/2008 | Sturgin | 192/3.26 |
| 2008/0202882 A1 | * | 8/2008 | Sturgin et al. | 192/3.25 |

* cited by examiner

*Primary Examiner* — Gregory Binda
*Assistant Examiner* — Matthieu Setliff
(74) *Attorney, Agent, or Firm* — Simpson & Simpson, PLLC

(57) ABSTRACT

A multi-function torque converter including: an apply pressure chamber for a torque converter clutch; a first pressure chamber including a torus; and a resilient flow control element in fluid communication with the apply chamber and the first pressure chamber and arranged to control fluid flow to the apply pressure chamber. The resilient flow element is displaceable to block fluid flow to the apply pressure chamber in torque converter mode for the torque converter and to enable fluid flow to the apply chamber in lock-up mode. The torque converter includes a second pressure chamber and the clutch includes a piston plate at least partially bounding the apply pressure chamber and the second pressure chamber.

17 Claims, 11 Drawing Sheets

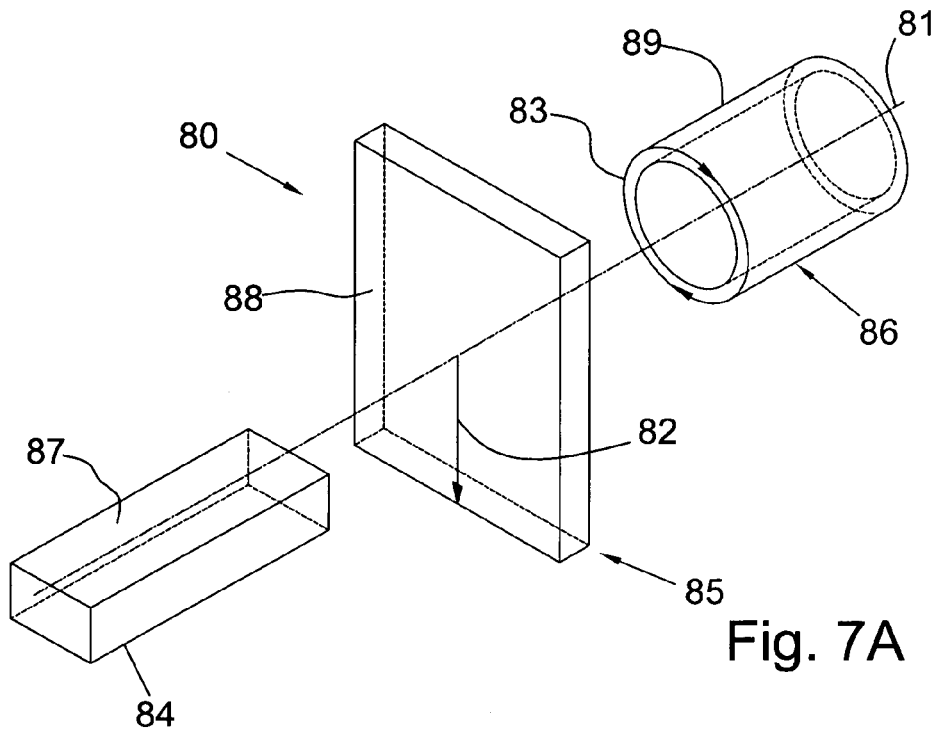
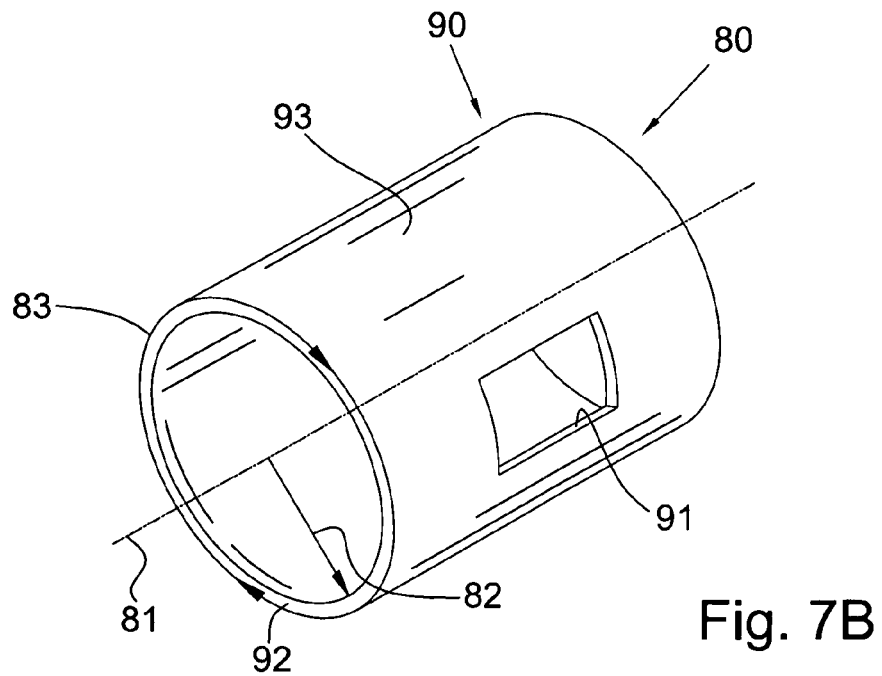

TWO PASS MULTI-FUNCTION TORQUE CONVERTER

CROSS-REFERENCE TO RELATED APPLICATIONS

This application claims the benefit under 35 U.S.C. §119(e) of U.S. Provisional Application No. 60/959,113, filed Jul. 11, 2007.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a multi-function torque converter with a two pass system using a solid transmission input shaft that functions as a three pass system.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

In lock-up mode for the torque converter, there is little or no torque applied to turbine hub 19. At the same time, cover plates 16 are receiving engine torque through the damper. Thus, there is intermittent contact between cover plate 16 and the turbine hub at the at the spline connection between the plate and the hub, resulting in undesirable vibration and noise. Alternately stated, the cover plate 'bangs' against the turbine hub at the spline connection due to fluctuations in the engine torque, causing the vibration and noise noted above. Commonly-owned U.S. Provisional Patent Application No. 60/816,932, filed Jun. 28, 2006 discloses a means for preventing the vibration and noise noted above during operation of a torque converter during torque converter mode. However, it would be desirable to further reduce drag in the torque converter clutch during the operation in torque converter mode.

A traditional three pass transmission system requires a hollow transmission input shaft for the third pass. In two pass systems, it is possible to have an engine "flair" when the pump clutch disengaged and the turbine clutch would not engage, meaning the engine would 'run away' or rotate freely without restriction. Other systems allow the pump clutch to remain engaged when the torque converter clutch applies, but have continued to require a hollow input shaft and a three pass system.

It is known to use a dual-mass configuration and a pump clutch to disconnect the pump in a multi-function torque converter from the engine when a vehicle is idling. Unfortunately, the performance of such torque converters under various modes of operation and vehicle operating conditions may not be consistent.

Therefore, there is a long-felt need to provide a torque converter with a two pass system which is capable of maintaining pump clutch engagement while engaging the turbine clutch. In addition, there is a long-felt need to provide a transmission system that reduces engine 'run away' while maintaining a solid input shaft.

BRIEF SUMMARY OF THE INVENTION

The present invention broadly comprises a multi-function torque converter including: an apply pressure chamber for a torque converter clutch; a first pressure chamber including a torus; and a resilient flow control element in fluid communication with the apply chamber and the first pressure chamber and arranged to control fluid to the apply pressure chamber. In a first embodiment, the resilient flow control element is arranged to block fluid to the apply pressure chamber in torque converter mode for the torque converter. In a second embodiment, the torque converter includes a second pressure chamber and the clutch includes a piston plate at least partially bounding the apply pressure chamber and the second pressure chamber and the piston plate includes an orifice in fluid communication with the apply pressure chamber and the second pressure chamber.

In a third embodiment, the torque converter includes cooling fluid, the clutch includes friction material and during lock-up mode for the torque converter, the cooling fluid is arranged to flow from the apply pressure chamber through the friction material via the orifice and the second pressure chamber. In a fourth embodiment, the second pressure chamber is a pressure release during torque converter mode and lock-up mode for the torque converter. In a fifth embodiment, the first pressure chamber is a pressure release during idle disconnect mode for the torque converter. In a sixth embodiment, the torque converter includes a pump clutch and the first pressure chamber includes an apply pressure chamber for the pump clutch and in lock-up mode for the torque converter, the resilient flow control element is arranged to enable fluid communication to the apply pressure chamber.

In a seventh embodiment, the torque converter includes a pump clutch, the first pressure chamber includes an apply pressure chamber for the pump clutch and pressure in the first pressure chamber is arranged to close the pump clutch in lock-up and torque converter modes for the torque converter. In an eighth embodiment, the torque converter includes a second pressure chamber and a pump clutch, the first pressure chamber includes an apply pressure chamber for the pump clutch, and, during idle disconnect mode for the torque converter, pressure in the second pressure chamber is arranged to be increased to disconnect the torque converter clutch and the pump clutch. In a ninth embodiment, the torque converter includes a first pressure channel arranged to provide cooling fluid to the apply pressure chamber and the first pressure chamber or the torque converter includes a second pressure channel arranged to provide cooling fluid to the second pressure chamber.

The present invention also broadly comprises a multi-function torque converter including: an apply pressure chamber for a torque converter clutch; and a resilient flow control element. In torque converter mode for the torque converter, the resilient flow control element is arranged to block fluid flow to the apply pressure chamber and in lock-up mode for the torque converter, the resilient flow control element is arranged to enable fluid flow to the apply pressure chamber. In one embodiment, the torque converter includes a torque converter clutch piston plate and fluid flow to the apply pressure chamber is arranged to axially displace the torque converter clutch piston plate. In another embodiment, the torque converter includes a torque converter clutch and the axial displacement of the torque converter clutch piston plate engages the torque converter clutch.

The present invention further broadly comprises a multi-function torque converter including: a first fluid circuit including an apply pressure chamber for a pump clutch and an apply pressure chamber for a torque converter clutch; a second fluid circuit at least partially bounding the respective apply pressure chambers for the torque converter and pump clutches; and a resilient flow control element arranged to control flow to the apply pressure chamber for the torque converter clutch. In one embodiment, the pump clutch is disengaged when pressure in the second fluid circuit is greater than pressure in the first fluid circuit. In another embodiment, the torque converter clutch is disengaged when pressure in the second fluid circuit is greater than pressure in the apply pressure chamber.

The present invention also broadly comprises a torque converter including: a first pressure chamber including a torus; a second pressure chamber; and a resilient flow control element axially displaceable to control an opening between the first and second pressure chambers during lock-up mode for the torque converter. In a first embodiment, the resilient flow control element blocks the opening during torque converter mode for the torque converter. In a second embodiment, the torque converter includes a disconnect chamber independent of the first and second pressure chambers. In a third embodiment, when the fluid pressure is greater in the disconnect chamber than in the first and second pressure chambers during idle disconnect mode for the torque converter.

In a fourth embodiment, the torque converter includes a torque converter clutch, a torque converter clutch piston plate, and a pump clutch and the torque converter clutch includes friction plates rotationally connected to the torque converter clutch piston plate. In a fifth embodiment, when the fluid pressure in the disconnect chamber is greater than the fluid pressure in the first and second pressure chambers, the torque converter clutch and pump clutch are urged to an open position. In a sixth embodiment, when fluid pressure in the second pressure chamber is increased, the fluid pressure axially displaces the torque converter clutch piston plate towards the first pressure chamber to close the torque converter clutch. In a seventh embodiment, the torque converter clutch is fixedly secured to the pump clutch.

The present invention also broadly comprises a method of controlling a torque converter comprising the steps of: forcing fluid through a channel to pressurize a first chamber; applying a first pressure to close a pump clutch; applying a second fluid pressure; axially displacing a resilient flow control element with the second fluid pressure; and axially displacing a torque converter clutch piston plate with the second pressure.

It is a general object of the present invention to provide a multi-function torque converter with a two pass fluid circuit which provides the functionality of a three pass fluid circuit.

It is also a general object of the present invention to provide a multi-function torque converter in which the pump clutch remains engaged while the turbine clutch is engaged to prevent 'run away.'

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 7A is a perspective view of a cylindrical coordinate system demonstrating spatial terminology used in the present application;

FIG. 7B is a perspective view of an object in the cylindrical coordinate system of FIG. 7A demonstrating spatial terminology used in the present application;

DETAILED DESCRIPTION OF THE INVENTION

Figure 1:
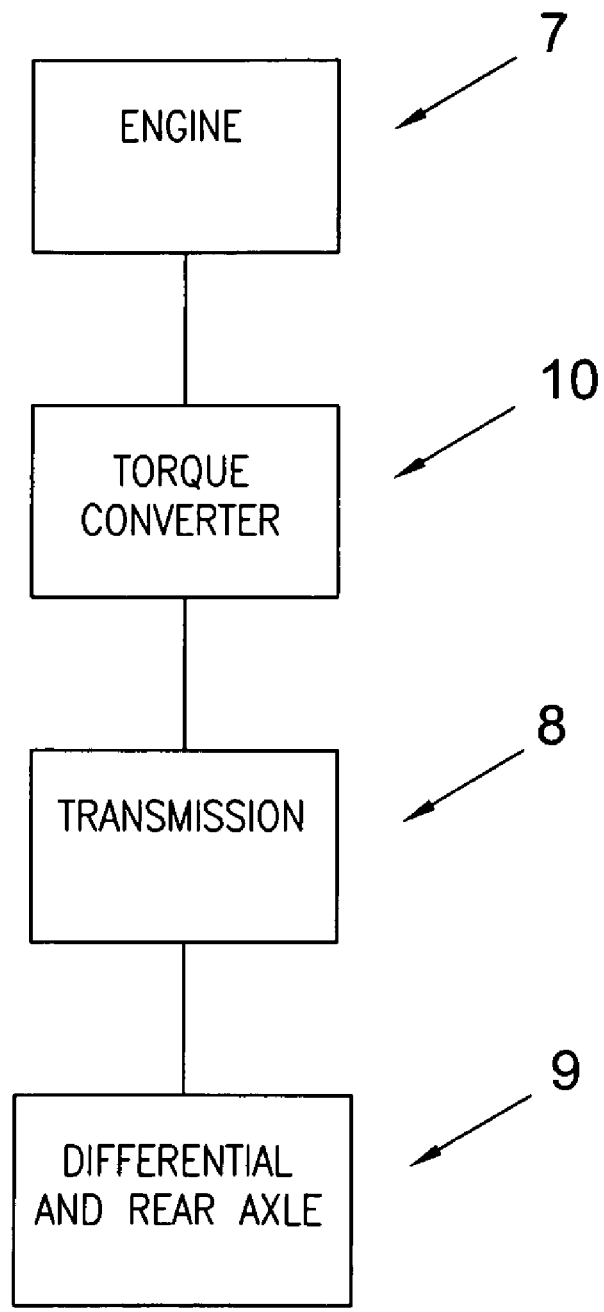
FIG. 1 is a general block diagram illustration of power flow in a motor vehicle, intended to help explain the relationship and function of a torque converter in the drive train thereof.
Figure 2:
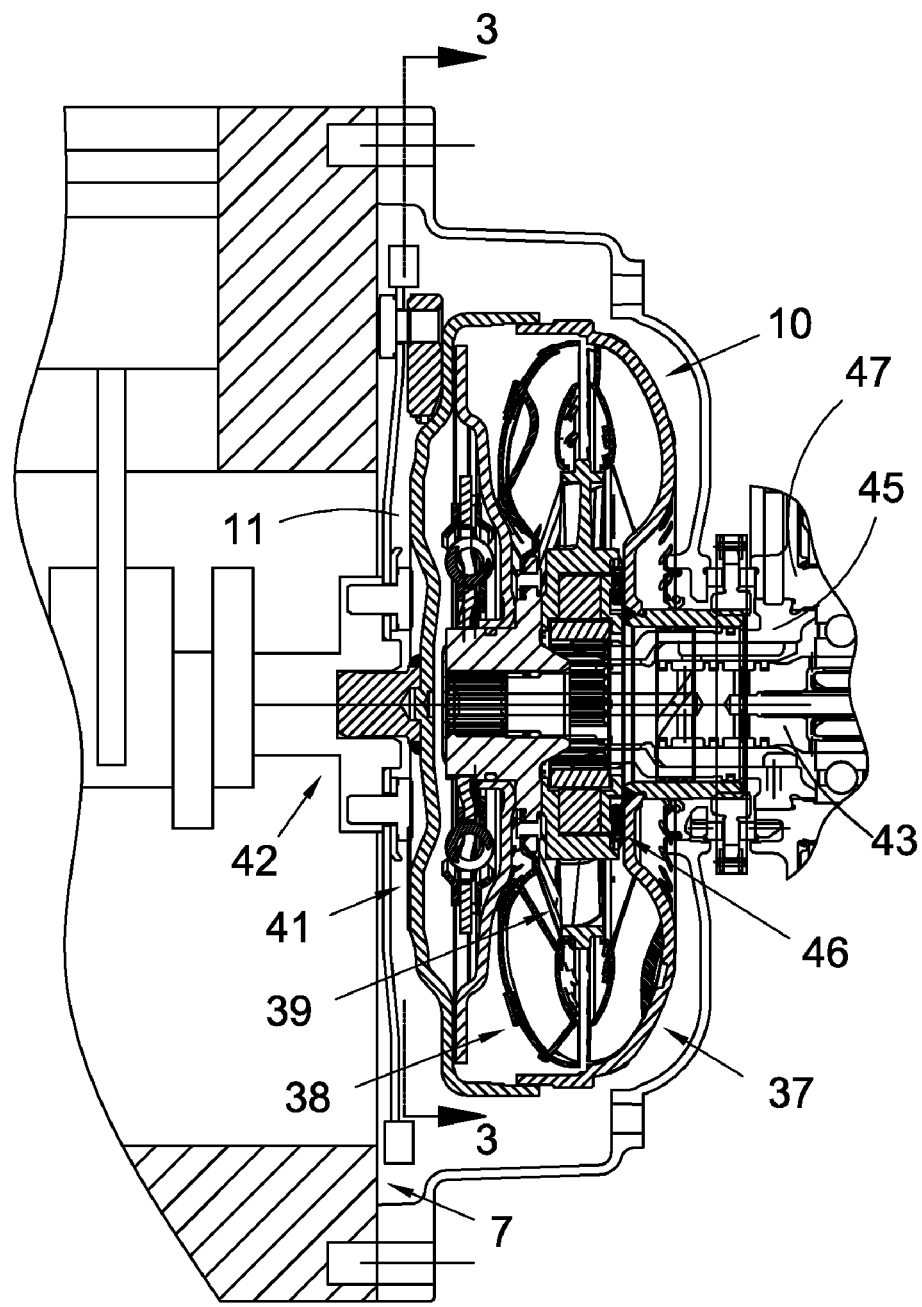
FIG. 2 is a cross-sectional view of a prior art torque converter, shown secured to an engine of a motor vehicle.
Figure 3:
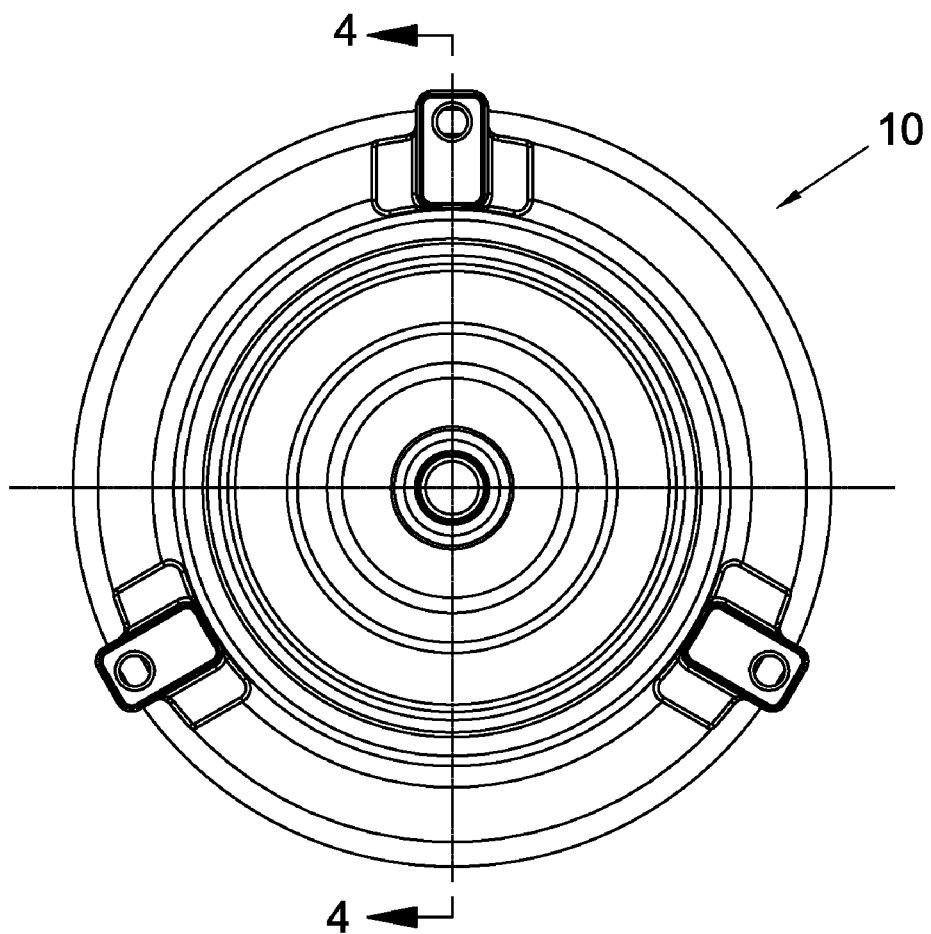
FIG. 3 is a left view of the torque converter shown in FIG. 2, taken generally along line 3-3 in FIG. 2.
Figure 4:
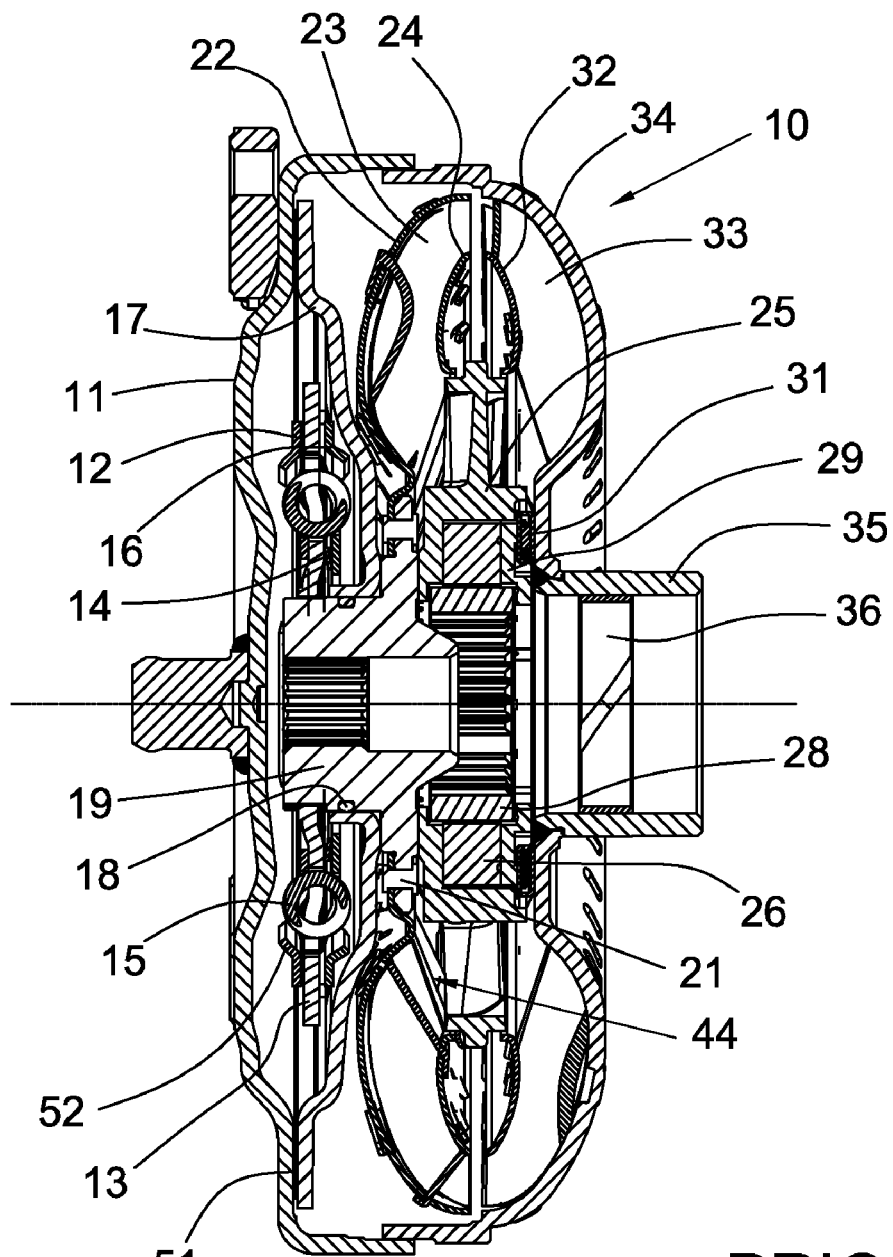
FIG. 4 is a cross-sectional view of the torque converter shown in FIGS. 2 and 3, taken generally along line 4-4 in FIG. 3.
Figure 5:
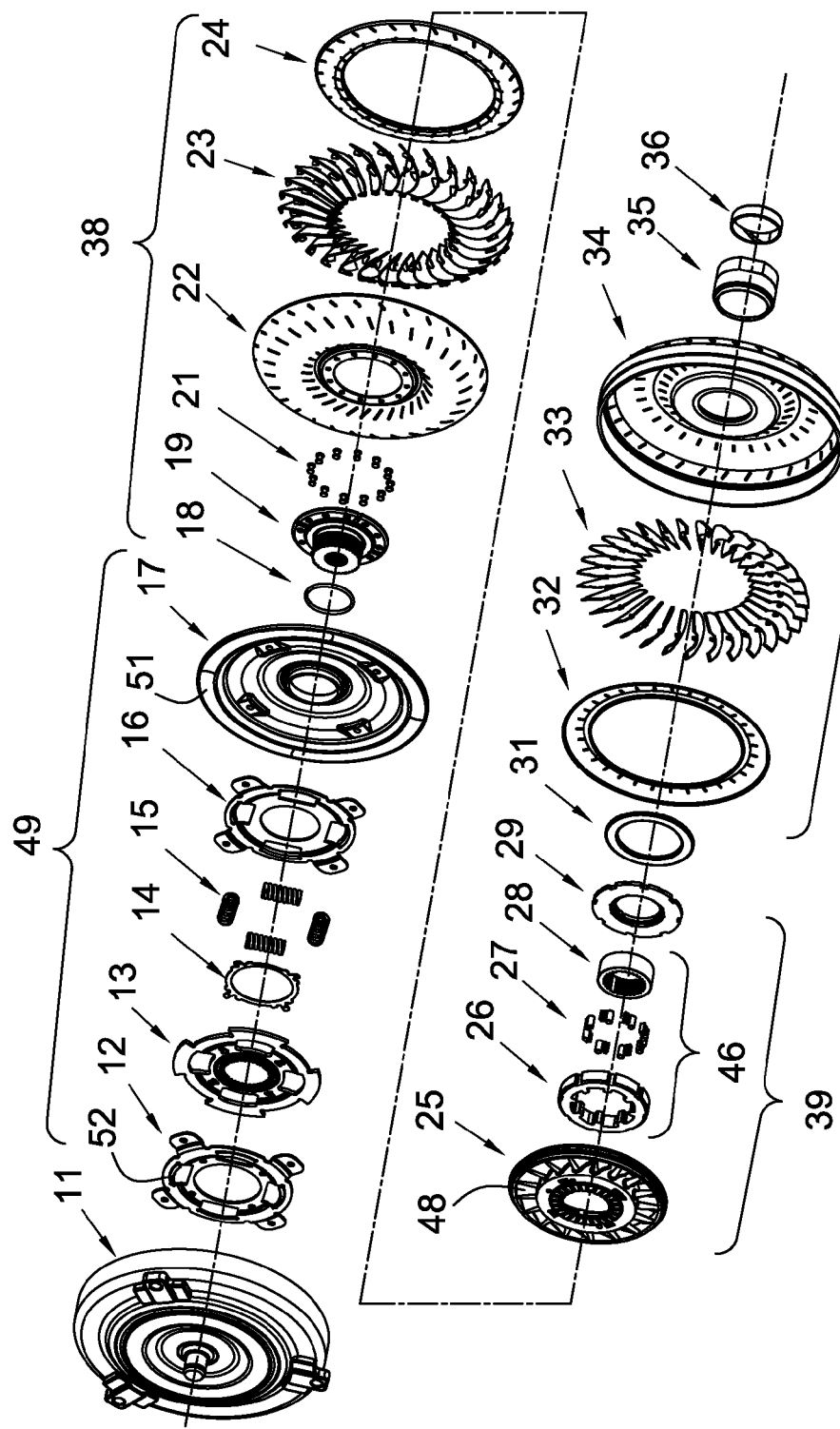
FIG. 5 is a first exploded view of the torque converter shown in FIG. 2, as shown from the perspective of one viewing the exploded torque converter from the left.
Figure 6:
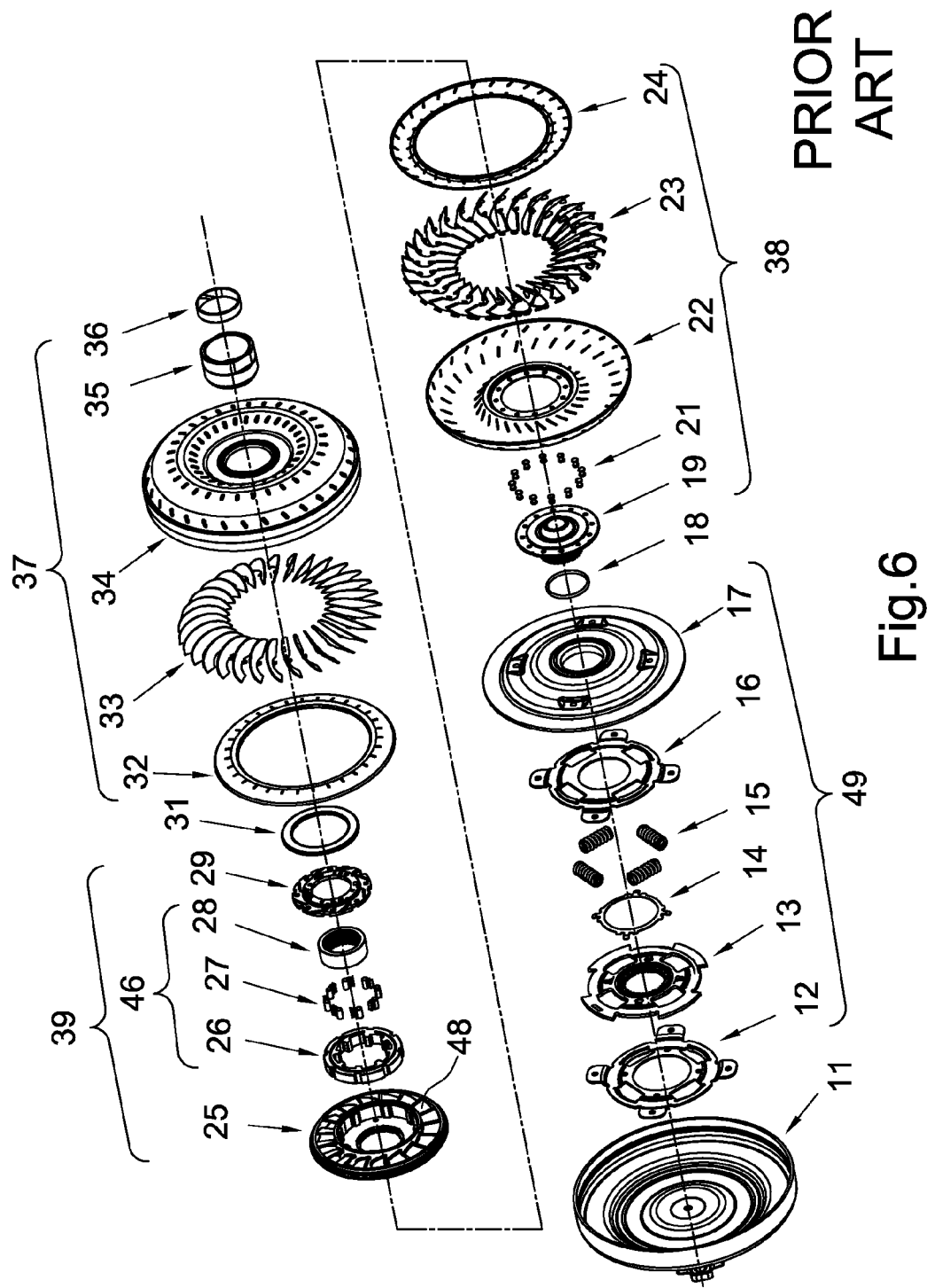
FIG. 6 is a second exploded view of the torque converter shown in FIG. 2, as shown from the perspective of one viewing the exploded torque converter from the right.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially,"

"radially," and "circumferentially" also are regarding orientation parallel to respective planes.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
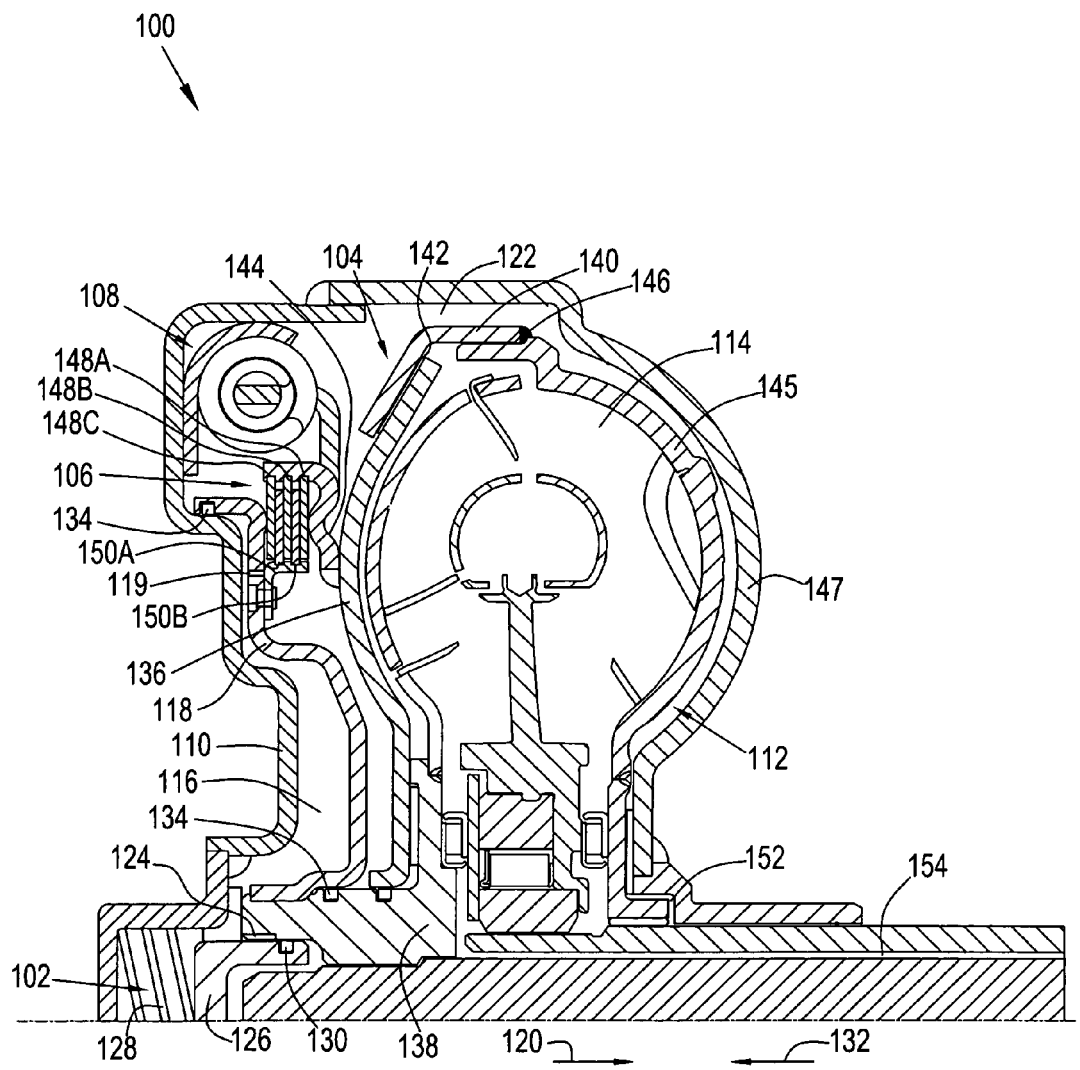
FIG. 8 is a partial cross-sectional view of a present invention torque converter with a pump clutch.

FIG. 8 is a partial cross-sectional view of present invention multi-function torque converter 100. Torque converter 100 includes resilient flow control element 102, pump clutch 104 rotationally connected to torque converter clutch 106, damper 108 rotationally connected to cover 110, and pump 112. The pump clutch forms a portion of pressure chamber 114. By forming a portion of pressure chamber 114, we mean that pump clutch 104 forms at least a portion of a boundary for the pressure chamber. That is, the pump clutch forms a portion of the exterior of the chamber. Resilient flow control element 102 also forms at least a portion of a boundary for pressure chamber 114.

Apply chamber 116 is operatively arranged to axially displace torque converter clutch piston plate 118 in the direction of arrow 120 when the pressure in chamber 116 is greater than the pressure in chamber 122. Chamber 116 receives fluid flow from chamber 114 through flow key 124 when pressure in chamber 114 overcomes the force of resilient flow control element 102. Resilient flow control element includes plunger 126, spring 128, and seal 130. Spring 128 may be a coil spring, wave washer, a Bellville spring, or any other spring known in the art. In order for fluid to be transferred through flow key 124, plunger 126 must be axially displaced in the direction of arrow 132. Once plunger 126 is displaced beyond flow key 124, fluid from chamber 114 will flow through flow key 124 and into chamber 116.

Apply chamber 116 is at least partially formed by torque converter clutch piston plate 118, seals 134, and cover 110. Fluid pressure in chamber 116 axially displaces torque converter clutch piston plate 118, thereby engaging torque converter clutch 106, when the pressure in apply chamber 116 is greater than the pressure in chamber 122. When the fluid pressure in chamber 114 overcomes the force of resilient flow control element 102, pressure is equalized between chambers 114 and 116 due to the fluid communication between the chambers. Chamber 122 acts as a pressure release when fluid pressure is applied to chambers 114 and 116. Conversely, chamber 114 acts as a pressure release when fluid pressure is applied to chamber 122.

Chamber 114 is at least partially formed by pump 112, pump clutch 104, pump clutch piston plate 136, turbine hub 138, and plunger 126. Pump clutch 104 includes piston plate 136, support plate 140, and friction material 142. Support plate 140 is connected to pump shell 145 by any connection means known in the art, which could be weld 146, rivets, or any other connection means. Support plate 140 is operatively arranged to resist the application force of piston plate 136 caused by movement in chamber 114. Friction material 142 is operatively arranged between portions of piston plate 136 and support plate 140. Pump clutch 104 is operatively arranged to close when pressure in chamber 114 is greater than pressure in chamber 122 and to open when pressure in chamber 122 is greater than chamber 114. In some aspects, chamber 114 also includes an apply pressure chamber for pump clutch 104 at least partially formed by the turbine.

Piston plate 136 is sealed to turbine hub 138 with a seal and rotationally connected to clutch 106 through connection means 144 and may be rotationally connected to turbine hub 138. The rotational connections may be a splined connection. By rotationally connected, or secured, we mean that the piston plate and the clutch are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, tow components that are rotationally connected can be axially fixed one to the other. The preceding explanation of rotational connection is applicable to the discussions infra.

Since piston plate 136 is rotationally secured to clutch 106 through connection means 144, which is in turn connected to damper 108 and cover 110, piston plate 136 is operatively arranged to rotate at engine speed. When pump clutch 104 is engaged, meaning when fluid pressure in chamber 114 is greater than fluid pressure in chamber 122, engine rotation is transmitted through the pump clutch to pump 112. Since pump 112 is rotationally connected through pump clutch 104, engine rotation is regulated anytime the pump clutch is engaged, or closed, through fluid dampening. By regulated, we mean the rotation of pump 112 is resisted by the fluid in chamber 114, thereby preventing engine 'run away.' By resisted, we mean that the fluid in chamber 114 opposes the rotation of pump 112 preventing acceleration when other dampening elements are removed from the torque circuit. By 'run away', we mean that acceleration which unexpectedly increases due to the removal of opposing forces. Alternately stated, 'run away' is an undesirable condition in which engine speed increases due to removal of a dampening force.

Torque converter clutch 106 includes friction plates and friction material disposed between the friction plates. Friction plates 148A, 148B, and 148C are rotationally secured to connection means 144 and arranged for frictional engagement with friction plates 150A and 150B through friction material between friction plates 148A-C and 150A-B. Any type of friction material known in the art can be used. The friction material can also be configured in any manner known in the art. For example, the friction material can be fastened to another component, such as friction plates 148, or can be separate elements that are disposed between other components, such as friction plates 148A, 148B, and 148C. In operation, compression of clutch 106 frictionally engages friction plates 148 and 150, thereby rotationally engaging connection means 144 and torque converter clutch piston plate 118. Clutch 106 is compressed by piston plate 118 and piston plate 136, when fluid pressure in chambers 114 and 116 are both greater than fluid pressure in chamber 122.

Pump clutch 104 is operatively arranged to be engaged during torque converter mode and torque converter clutch mode for the torque converter as described infra. In torque converter mode, pump clutch 104 is engaged by fluid pressure in chamber 114 being greater than fluid pressure in chamber 122, which is in fluid communication with chamber 114. When the clutch is closed, the cooling fluid is arranged to flow from chamber 114 through the friction material, for example, through grooves in the friction material (not shown), to chamber 122. Thus, torque converter 100 provides an advantageous cooling flow through the friction material, enhancing the performance and durability of the friction material, while continuing to receive cooling flow from the torus. In some aspects, piston plate 136 includes an orifice (not shown) arranged to enable a flow of cooling fluid from chamber 114 to chamber 122. For example, the orifice provides a dimensionally stable passageway for the flow. In some aspects, piston plate 118 may also include orifice 119 arranged to enable a flow of cooling fluid from chamber 116 to chamber 122.

Chamber 122 receives fluid through channel 152, while chambers 114 and 116 receive fluid through channel 154. Thus, with the use of resilient flow control element 102, channel 154 acts as a two pass channel, proving fluid pressure to two chambers with the presence of only one channel. Advantageously, this arrangement allows the operation of three chambers with only two input channels. In operation, when fluid is directed through channel 152, channel 154 acts as a pressure release channel, whereby fluid can be diverted to channel 154 as a means of reducing the pressure in channel 152. In the same manner, channel 152 acts as a means of reducing pressure in channel 154 as described supra.

Figure 9:
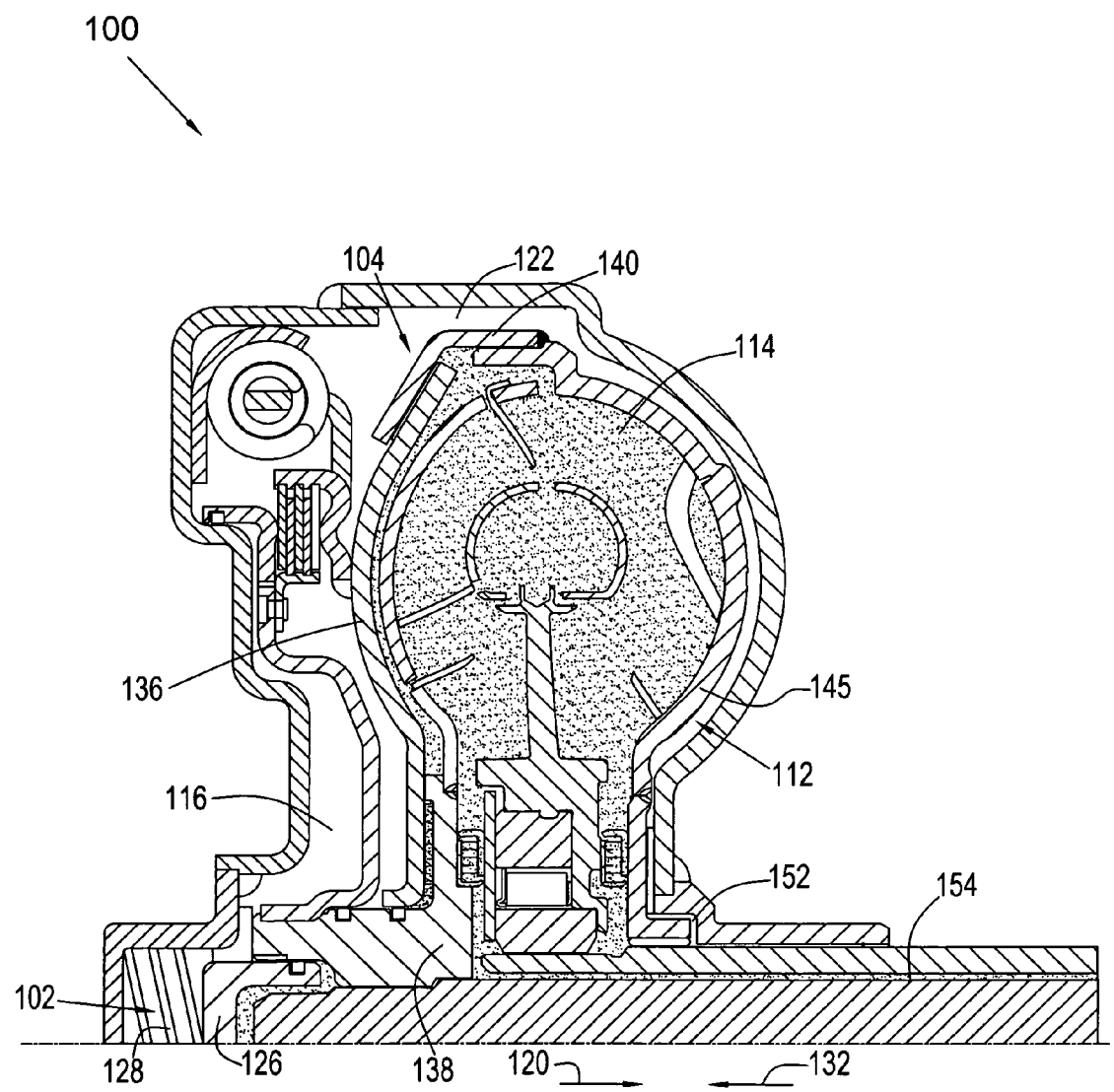
FIG. 9 is a partial cross-sectional view of the torque converter shown in FIG. 8, during torque converter mode for the torque converter.

FIG. 9 is a partial cross-sectional view of torque converter 100 during torque converter mode for the torque converter. During torque converter mode, fluid pressure is introduced to chamber 114 through channel 154 so that the pressure in chamber 114 is greater than pressure in chamber 122 and chamber 116. While in torque converter mode, fluid pressure in chamber 114 does not generate enough force to overcome the force of resilient flow control element 102, therefore chamber 116 does not have fluid pressure present during torque converter mode for the torque converter and chamber 114 is not in fluid communication with chamber 116.

Piston plate 136 is axially forced in the direction of arrow 132 by fluid in chamber 114. The axial movement of piston plate 136 engages pump clutch 104 and rotationally connects pump 112 and piston plate 136. Since piston plate 136 is rotationally connected to cover 110, pump 112 is arranged to rotate at engine speed during torque converter mode and multiply torque. Although piston plate 136 moves axially towards clutch 106, clutch 106 does not engage because the axial travel of piston plate 136 is not large enough to compress the torque converter clutch.

Figure 10:
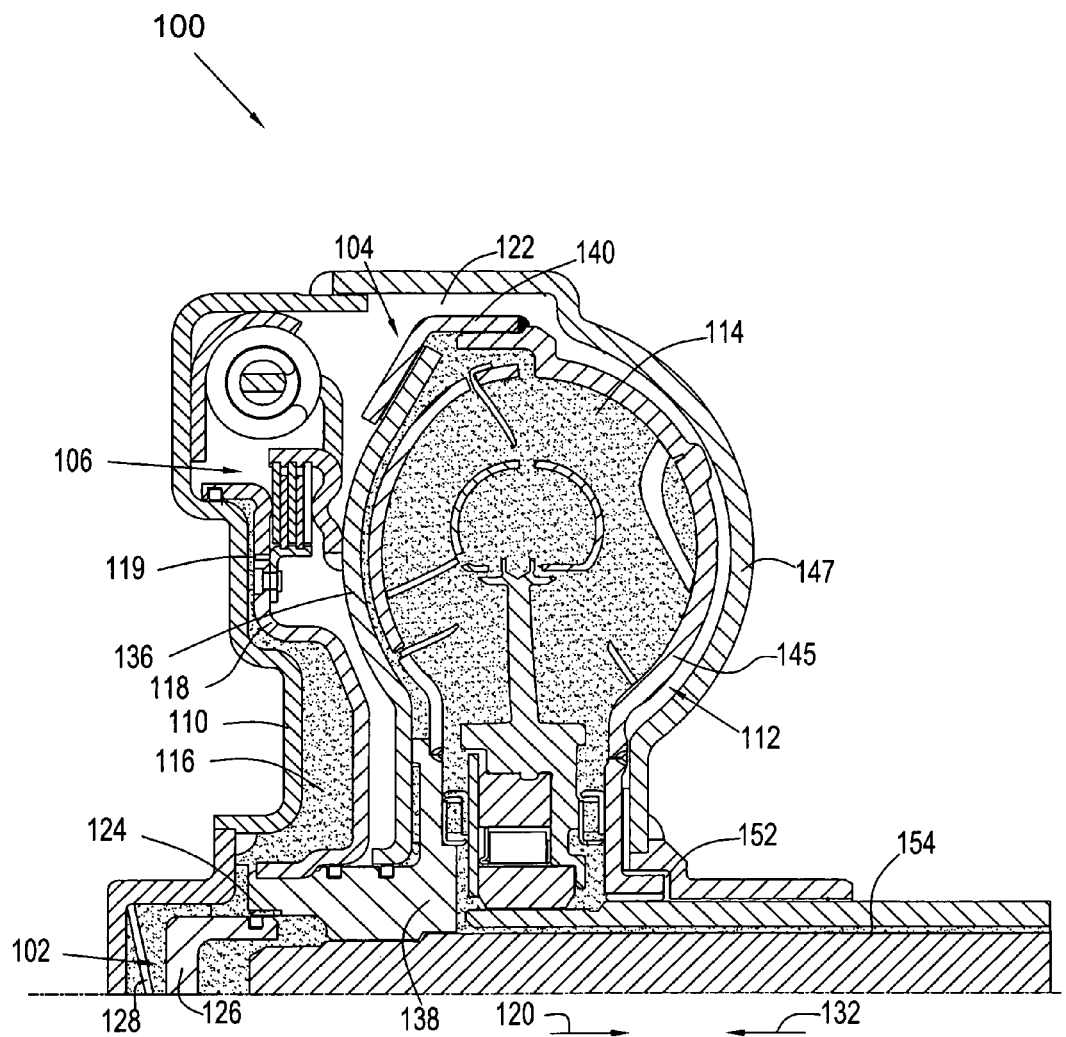
FIG. 10 is a partial cross-sectional view of the torque converter shown in FIG. 8, during lock-up mode for the torque converter; and, FIG. 11 is a partial cross-sectional view of the torque converter shown in FIG. 8, during idle disconnect mode for the torque converter.

FIG. 10 is a partial cross-sectional view of torque converter 100 during lock-up mode for the torque converter. During lock-up mode, like during torque converter mode, fluid pressure is introduced to chamber 114 through channel 154 so that the pressure in chamber 114 is greater than pressure in chamber 122 and chamber 116. However, the fluid pressure in chamber 114 is increased so that resilient flow control element 102 is axially displaced in the direction of arrow 132 beyond keyhole 124, thereby arranging chambers 114 and 116 in fluid communication. In this arrangement, fluid is transferred from chamber 114 to chamber 116 and equalized between the two chambers while resilient flow control element 102 remains in the displaced state. Similar to torque converter mode as noted supra, pump clutch 104 remains engaged during lock-up mode as the pressure in chamber 114 is still greater than the pressure in chamber 122. Since pump clutch 104 remains engaged during the transition between torque converter mode and lock-up mode, the engine (not shown) continues to be regulated through dampening by pump 112, thereby preventing 'run away' as noted supra.

In lock-up mode, piston plate 118 is axially displaced in the direction of arrow 120 and compresses torque converter clutch 106, thereby rotationally connecting cover 110 and turbine hub 138. The rotational connection between cover 110 and turbine hub 138 creates a virtual one-to-one connection where a minimal amount of energy is lost. In lock-up mode, torque converter clutch 106 and pump clutch 104 remain engaged, therefore the damper, clutches, turbine, turbine hub, and pump all rotate as an assembly.

To change from lock-up mode to torque converter mode, fluid in channel 154 is decreased, so that resilient flow control element 102 overcomes the pressure in chamber 114 and seals chamber 116 from chamber 114. In this arrangement, chamber 116 no longer receives fluid pressure, and piston plate 118 is urged axially towards cover 110. However, since there is still fluid pressure in chamber 114 pump clutch 104 remains engaged during the transition from lock-up mode to torque converter mode.

Figure 11:
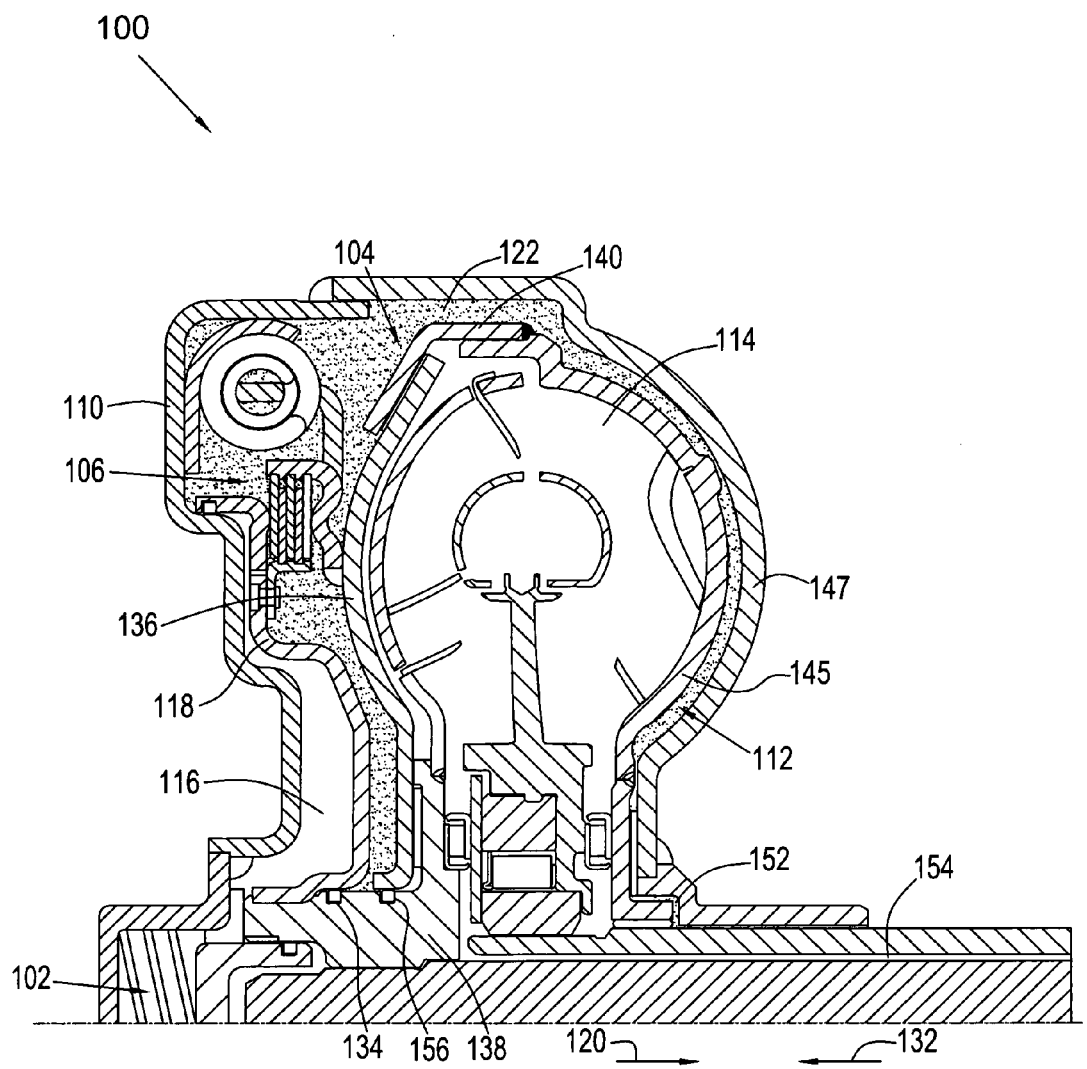

FIG. 11 is a partial cross-sectional view of torque converter 100 during idle disconnect mode for the torque converter. During idle disconnect mode, fluid is introduced to chamber 122 through channel 152 so that the pressure in chamber 122 is greater than the pressure in chamber 114 and chamber 116. Since the pressure in chamber 122 is greater than the pressure in chamber 114, pump clutch 104 is urged open, or alternately stated, piston plate 136 is forced in the direction of pump 112. When pump clutch 104 is open, pump 112 no longer rotates at engine speed with cover 110 and torque is not transmitted to support plate 140 and pump 112 since piston plate 136 freely rotates. In some aspects, chamber 122 is at least partially sealed by turbine hub 138 and seals 134 and 156. In a preferred embodiment, the pressure in chamber 114 remains constant and the pressure in chamber 122 is increased to disconnect pump clutch 104. Advantageously, this arrangement allows faster engagement of the pump clutch since pressure can be decreased quicker than pressure can be built up.

In addition, since pressure in chamber 122 is greater than in chamber 116, piston plate 118 does not engage torque converter clutch 106. Since clutch 106 is disengaged, or open, turbine hub 138 is allowed to rotate freely. As described supra, since both clutches 104 and 106 are disengaged, cover 110 and outer pump shell 147 freely rotate at engine speed without restriction from the torque converter components. Advantageously, this arrangement allows the engine (not shown) to both rotate and accelerate faster, thereby permitting the engine to be turned off during idle or deceleration conditions and restarted quickly when power is again necessary.

The following should be viewed in light of FIGS. 8 through 11. The present invention further includes a method of operating a torque converter. Although the method is described as a sequence of steps for clarity, no order should be inferred unless explicitly stated. In torque converter mode for the torque converter, a first step introduces fluid into chamber 114 through channel 154 by a transmission pump (not shown) and axially displaces piston plate 136 to engage pump clutch 104.

In lock-up mode for the torque converter, a first step introduces fluid into chamber 114 through channel 154 by a transmission pump (not shown) and axially displaces piston plate 136 to engage pump clutch 104. A second step increases the fluid pressure in chamber 114, once the pump clutch is engaged, to axially displace resilient flow control element 102 in the direction of arrow 132 to enable fluid equalization between chambers 114 and 116. A third step axially displaces piston plate 136 in the direction of arrow 120 with fluid pressure in chamber 116 to engage torque converter clutch 106. A fourth step compresses clutch 106 due to the axial displacement of piston plate 116, enabling the transmission of torque from cover 110 to damper 108. A fifth step transmits torque from damper 108 through piston plate 110 to turbine hub 138.

In idle disconnect mode for the torque converter, a first step introduces fluid into chamber 122 through channel 152 by a transmission pump (not shown) and axially displaces piston plate 136 in the direction of arrow 120 and axially displaces piston plate 118 in the direction of arrow 132. The respective displacement of piston plates 120 and 132 disengages, or opens, both the pump clutch and the torque converter clutch. Since both clutches are open, torque is not transmitted through the torque converter.

It should be understood that a present invention torque converter is not limited to the type, size, number, or configuration of components shown in the figures and that other types, sizes, numbers, or configurations of components are included in the spirit and scope of the claimed invention. For example, a present invention torque converter is not limited to the use of a torque converter clutch or damper with the configurations shown and other types of components and numbers, sizes, and configurations of components for a torque converter clutch or damper are included in the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A multi-function torque converter comprising:
a torque converter clutch including a piston plate;
an apply pressure chamber for the torque converter clutch, the apply pressure chamber of the torque converter clutch at least partially bounded by the piston plate;
a first pressure chamber including a torus, the first pressure chamber including an apply pressure chamber for a pump clutch;
a second pressure chamber at least partially bounded by the piston plate and sealed with respect to the apply pressure chamber for the torque converter clutch; and,
a resilient flow control element in fluid communication with the apply chamber for the torque converter clutch and the first pressure chamber and arranged to control fluid flow to the apply pressure chamber for the torque converter clutch and to the apply chamber for the pump clutch, wherein the piston plate is arranged to displace to close the torque converter clutch when fluid pressure in the apply chamber for the torque converter clutch is greater than fluid pressure in the second pressure chamber.

2. The torque converter of claim 1 wherein the resilient flow control element further comprises a spring and a plunger.

3. The torque converter of claim 1 wherein in torque converter mode for the torque converter, the resilient flow element is arranged to block fluid flow to the apply pressure chamber for the torque converter clutch.

4. The torque converter of claim 1 wherein the piston plate includes an orifice in fluid communication with the apply pressure chamber for the torque converter clutch and the second pressure chamber.

5. The torque converter of claim 4 including cooling fluid, wherein the torque converter clutch includes friction material and wherein during lock-up mode for the torque converter, in which both the torque converter clutch and the pump clutch are closed, the cooling fluid is arranged to flow from the apply pressure chamber for the torque converter clutch through the friction material via the orifice and the second pressure chamber.

6. The torque converter of claim 1 wherein during a transition from a torque converter mode, in which the pump clutch is closed, to an idle disconnect mode, in which the pump clutch is open, the fluid pressure in the second pressure chamber is increased.

7. The torque converter of claim 1 wherein pressure in the first pressure chamber is arranged to close the pump clutch in lock-up and torque converter modes for the torque converter.

8. The torque converter of claim 1 wherein, during idle disconnect mode for the torque converter, in which the pump clutch is open, pressure in the second pressure chamber is arranged to be increased to disconnect the torque converter clutch and the pump clutch.

9. The torque converter of claim 1 including a first pressure channel arranged to provide cooling fluid to the apply pressure chamber for the torque converter clutch and the first pressure chamber.

10. A multi-function torque converter including:
a torque converter clutch including a piston plate;
an apply pressure chamber for the torque converter clutch, the apply pressure chamber at least partially bounded by the piston plate;
a second pressure chamber at least partially bounded by the piston plate; and,
a resilient flow control element, wherein in a first mode for the torque converter, the resilient flow control element is arranged to block fluid flow to the apply pressure chamber, wherein in a second mode for the torque converter, the torque converter clutch is closed and the resilient flow control element is arranged to enable fluid flow to the apply pressure chamber, and wherein the piston plate is arranged to displace to close the torque converter clutch when fluid pressure in the apply chamber is greater than fluid pressure in the second pressure chamber.

11. A multi-function torque converter including:
a torque converter clutch including a piston plate;
a first fluid circuit including an apply pressure chamber for a pump clutch and an apply pressure chamber for the torque converter clutch, the apply pressure chamber for the torque converter clutch at least partially bounded by the piston plate;
a second fluid circuit including a first pressure chamber at least partially bounding the respective apply pressure chambers for the torque converter and pump clutches and sealed with respect to the apply pressure chamber for the torque convert clutch; and,
a resilient flow control element arranged to control flow to the apply pressure chamber for the torque converter clutch, wherein the piston plate is arranged to displace to close the torque converter clutch when fluid pressure in the apply chamber for the torque converter clutch is greater than fluid pressure in the first pressure chamber.

12. A torque converter comprising:
a torque converter clutch including a piston plate;
a first pressure chamber including a torus;
a second pressure chamber including an apply chamber for a torque converter clutch, the apply pressure chamber at least partially bounded by the piston plate;
a third pressure chamber at least partially bounded by the piston plate; and,
a resilient flow control element axially displaceable to control an opening between the first and second pressure chambers, wherein the piston plate is arranged to displace to close the torque converter clutch when fluid pressure in the apply chamber is greater than fluid pressure in the third pressure chamber.

13. The torque converter of claim 12 wherein the resilient flow control element blocks the opening during torque converter mode, in which the torque converter clutch is closed, for the torque converter.

14. The torque converter of claim 12 wherein the third chamber is sealable with respect to the first and second pressure chambers.

15. The torque converter of claim 12 wherein the torque converter clutch is rotationally connected to a pump clutch.

16. A method of controlling a torque converter comprising the steps of:

forcing fluid through a channel to pressurize a first chamber at least partially bounded by a piston plate for a pump clutch;

increasing a first pressure in the first chamber such that the first pressure is greater than a second pressure in a second chamber at least partially bounded by the piston plate;

displacing the piston to close the pump clutch;

applying a third fluid pressure;

axially displacing a resilient flow control element with the third fluid pressure to increase pressure in a third chamber with the third fluid pressure such that the pressure in the third chamber is greater than pressure in the second chamber; and axially displacing a torque converter clutch piston plate with the pressure in the third chamber to close a torque converter clutch.

17. The method of claim 16 further comprising the step of transmitting torque from a cover through a damper and the torque converter clutch to a turbine hub.

* * * * *